United States Patent
Herrmann

(10) Patent No.: US 11,400,813 B2
(45) Date of Patent: Aug. 2, 2022

(54) HUMAN MACHINE INTERFACE WITH LIGHT SENSING CONTACT ACTIVATION

(71) Applicant: MOTHERSON INNOVATIONS COMPANY LIMITED, London (GB)

(72) Inventor: Andreas Herrmann, Stuttgart (DE)

(73) Assignee: Motherson Innovations Company Limited, London (GB)

(*) Notice: Subject to any disclaimer, the term of this patent is extended or adjusted under 35 U.S.C. 154(b) by 169 days.

(21) Appl. No.: 16/940,966

(22) Filed: Jul. 28, 2020

(65) Prior Publication Data
US 2021/0031628 A1   Feb. 4, 2021

(30) Foreign Application Priority Data
Jul. 29, 2019   (DE) .................... 10 2019 120 399.6

(51) Int. Cl.
| | |
|---|---|
| B60K 35/00 | (2006.01) |
| G02B 1/10 | (2015.01) |
| G01C 3/08 | (2006.01) |
| B60R 1/12 | (2006.01) |
| G06F 3/042 | (2006.01) |

(52) U.S. Cl.
CPC ............ *B60K 35/00* (2013.01); *B60R 1/12* (2013.01); *G01C 3/08* (2013.01); *G02B 1/10* (2013.01); *G06F 3/0421* (2013.01); *B60K 2370/12* (2019.05); *B60K 2370/152* (2019.05); *B60K 2370/16* (2019.05); *B60K 2370/33* (2019.05); *B60R 2001/1215* (2013.01)

(58) Field of Classification Search
CPC ............ B60K 35/00; B60K 2370/12; B60K 2370/1446; B60K 2370/152; B60K 2370/16; B60K 2370/33; B60K 2370/336; B60K 2370/341; B60R 1/12; B60R 2001/1215; G01C 3/08; G02B 1/10; G02B 1/14; G06F 3/0421
See application file for complete search history.

(56) References Cited

U.S. PATENT DOCUMENTS

| | | | |
|---|---|---|---|
| 2009/0243824 A1 | 10/2009 | Peterson et al. | |
| 2010/0219935 A1* | 9/2010 | Bingle | E05B 81/76 340/5.54 |
| 2016/0264054 A1* | 9/2016 | Uken | G06F 3/047 |
| 2018/0218859 A1* | 8/2018 | Ligtenberg | G06F 3/0416 |

FOREIGN PATENT DOCUMENTS

| | | |
|---|---|---|
| EP | 2807284 B1 | 10/2017 |
| WO | WO 2016/009407 A1 | 1/2016 |

OTHER PUBLICATIONS

German Office Action dated Apr. 21, 2019 of German application No. DE 102019120399.6.

* cited by examiner

*Primary Examiner* — Nelson M Rosario
(74) *Attorney, Agent, or Firm* — Jones Day

(57) ABSTRACT

A human machine interface with light sensing contact activation includes an operating panel and a display unit, where the operating panel includes at least one or more of a transparent or translucent substrate provided with at least one key area and at least one illumination source which can emit light into the substrate, and the display unit provides at least one information section at least temporarily displaying information on at least one function, which can be contact activated via the at least one key area of the operating panel. A rearview device and a motor vehicle may include such a human machine interface.

17 Claims, 3 Drawing Sheets

HUMAN MACHINE INTERFACE WITH LIGHT SENSING CONTACT ACTIVATION

CROSS-REFERENCE TO RELATED APPLICATION

This application claims the benefit of foreign priority to German Patent Application No. DE 10 2019 120 399.6, filed Jul. 29, 2019, which is hereby incorporated by reference herein in its entirety for all purposes.

BACKGROUND

1. Field of the Invention

The present disclosure refers to an operating device including a human machine interface with light sensing contact activation and a rearview device as well as a motor vehicle with such a human machine interface.

2. Related Art

US 2017/160874 A1 describes an interior rearview mirror of a motor vehicle having an operating device with an operating surface which is arranged in a frame of a mirror element or adjacent to the mirror element or in an illumination module of the inner mirror, for an adjusting or dimming of the interior rearview mirror, adjusting of at least one exterior rearview mirror, opening of at least one window, setting an air conditioning system, switching a warning signal or similar. The operating device comprises at least one Time-of-Flight (ToF) sensor for emitting transmission signals in the form of light, receiving reception signals, and outputting information signals; at least one optical waveguide for guiding the transmission signals from the ToF sensor to at least one deflection point, and guiding deflection signals deflected at the deflection point to at least one assigned exit point acting as an operating element on a first surface of the optical waveguide, the first surface acting as an operating surface, in response to an object, in the form of a finger of a user, approaching the exit point or touching same for guiding reception signals deflected at the object; and a control unit, which triggers at least one function assigned to the operating element or the exit point dependent on the information signals outputted by the ToF sensor dependent on the reception signals, wherein the deflection point is provided on a second surface which is opposite to the first surface of the optical waveguide and constitutes a deflection surface of the optical waveguide via an extraction element, and wherein the ToF sensor comprises a transmitter for emitting the transmission signals in the beam path before a first end of the optical waveguide having a coupling surface and a receiver for receiving the reception signals when deflection at the exit point also before the first end of the optical waveguide.

Disclosed in WO 2015/001496 A1 is a capacitive touch panel comprising a transparent panel substrate, a front surface of the substrate comprising a conductive translucent layer which, in use, is visible to a user; at least one light source associated with the back surface, wherein said light source is switchable between an on state in which an illuminated icon is visible on the front surface of the cover panel and an off state in which the illuminated icon is not visible on the front surface of the cover panel, wherein the light source is switchable from the off state to the on state by a change in capacitance of the conductive translucent layer; at least one switch associated with the back surface, wherein the switch is activable by a user pressing the touch panel in the vicinity of the illuminated icon to provide an output signal capable of performing a function. Such a touch panel can be comprised by an automotive interior panel or device. Further, the conductive transparent or translucent metal layer can be formed from a metal, alloy or conductive metalloid selected from the group consisting of chromium, aluminium, titanium, nickel, molybdenum, zirconium, tungsten, niobium, tantalum, cobalt, manganese, silver, zinc, silicon, mixtures of any of the aforementioned, oxides of any of the aforementioned, nitrides of any of the aforementioned, borides of any of the aforementioned, carbides of any of the aforementioned, alloys of any of the aforementioned metals, steel, stainless steel, silicon. The front surface of the substrate can have a substantially uniform appearance with no visible icons or marks when the light source is in the off state. The light source is switchable from the off state to the on state by a detected change in capacitance resulting from an object capacitively coupling with the conductive transparent or translucent metal layer.

A mirror system of a vehicle of US 2009/243824 A1 includes an interior rearview mirror assembly having a reflective element and an information input display providing a display representative of a plurality of input characters. The information input display is disposed behind the reflective element and viewable through the reflective element and a transflective mirror reflector of the reflective element when the information input display is backlit by a backlighting device. A control is operable to determine a location of a touch or proximity of an object at the reflective element and correlate the determined location to an input character of the information input display. The mirror system may include a video display for displaying video images and the information input display may be disposed at a main viewing region of the reflective element so as to provide an information input display that is larger than the video display.

An operating device according to WO 2016/009407 A1 includes at least one ToF sensor for emitting transmission signals, in particular in the form of light, receiving reception signals and outputting information signals, at least one optical waveguide for directing the transmission signals from the ToF sensor to at least one deflection point, for directing the deflection signals deflected where the operating device can be installed in a motor vehicle.

A chromium-based reflective coating for a polymeric substrate is known from EP 2 807 284 A1, wherein the coating has a thickness of 200 nm or less and is an alloy of chromium and a dopant material, the dopant material being selected from the hexagonally close-packed transition metals, the alloy having a crystal structure of a primary body-centered cubic phase in coexistence with a secondary omega hexagonally close-packed phase.

Commonly used displays of touch screens have the problem that touch operations leave fingerprints on the display surface. These fingerprints can detract from cleanliness, and when used e.g. in motor vehicles used for ride sharing, can even lead to distraction and mal-operation. A contaminated display can affect the performance of the touch screen.

SUMMARY

In an aspect, a human machine interface with light sensing contact activation includes an operating panel and a display unit, wherein the operating panel includes at least one transparent and/or translucent substrate provided with at least one key area and at least one illumination source which can emit light into the substrate, and the display unit provides at least one information section at least temporarily displaying information on at least one function, which can be contact activated via the at least one key area of the operating panel. Further, a plurality of information sections and a plurality of key areas is provided, with each key area being associated with one information section, wherein each one of the key areas is aligned with and arranged next to one information section associated therewith.

With the present disclosure it is proposed that the operating panel is provided in form of a line, preferably arranged along an edge of the display unit.

In addition, it is proposed that the function and/or the information on the function displayed in the information section can be changed, by a user and/or depending on at least one parameter.

Embodiments of the present disclosure can be characterized by sensing means for monitoring the light emitted by the at least one illumination, preferably including at least one ToF (Time-of-Flight) sensor with the at least one illumination source, and control means for controlling the function defined by the information section in dependence of the light sensed by the sensing means, wherein preferably in case light is sensed and/or it is monitored that the sensed light is interrupted for a certain amount of time and/or the sensed light level is reduced or enhanced in a certain amount the control means activates the function.

With the present disclosure embodiments are proposed, which are characterized in that the at least one transparent and/or translucent substrate is provided with a chromium-based reflective coating with at least one opening or region of reduced thickness defining the at least one key area, wherein light emitted by the at least one illumination source can pass through the substrate and the opening or region of reduced thickness of the coating.

It is also proposed that the opening or region of reduced thickness of the coating include a cut-out, and/or the coating is provided with at least one selective laser cut-out in a depth of the coating, preferably each cut-out providing one opening.

Other embodiments of the present disclosure are characterized in that the at least one transparent and/or translucent substrate provides at least one optical waveguide for guiding the light emitted by the at least one illumination source to at least one deflection point, and for guiding deflection signals deflected at the deflection point to at least one assigned exit point in the at least one key area on a first surface of the optical waveguide, the first surface acting as an operating surface, and, in response to an object, in the form of a finger of a user, approaching the exit point or touching the same, for guiding reception signals deflected at the object; and the control means triggers the function assigned to the key area in receipt of information signals outputted by the ToF sensor dependent on the reception signals.

The deflection point can be provided on a second surface which is opposite to the first surface of the optical waveguide and constitutes a deflection surface of the optical waveguide via an extraction element, wherein preferably the extraction element is provided by a recess, in the form of a milled point, in the material of the optical waveguide or via a material inclusion, and/or a coating.

It is proposed that at least one mark in the key area, preferably in the form of a coating, surface processing such as polishing or illumination of the optical waveguide, preferably with visible light transmitted when an object approaches, such as in the form of a finger of a user, and/or with greater intensity when registering a touch of the key area by the object, is provided.

With the present disclosure it is proposed that the substrate is a polymeric substrate, wherein preferably the polymeric substrate includes a pre-coated film in the form of either a hardcoat, an inorganic oxide, or a thin metal film, or a combination of such pre-coated films.

It is also proposed that the coating has a thickness of 200 nm or less and is an alloy of chromium and a dopant material, the dopant material being selected from the hexagonally close-packed transition metals, and the alloy having a crystal structure of a primary body-centered cubic phase in coexistence with a secondary omega hexagonally close-packed phase, wherein the alloy is a binary alloy of chromium and the dopant material, and the atomic percentage of the dopant material in the binary alloy is in the range of from about 1.9 at. % to about 5.8 at. %.

In this respect it is proposed that the dopant material is selected from the hexagonally close-packed transition metals zirconium, titanium, cobalt, hafnium, ruthenium, yttrium and osmium, preferably the dopant material is selected from the hexagonally close-packed transition metals zirconium, titanium and cobalt, and/or the dopant material is zirconium, with the atomic percentage of the zirconium in the binary alloy being in the range of from about 4.5 at. % to about 5.8 at. %, or the dopant material is titanium, with the atomic percentage of the titanium in the binary alloy being in the range of from about 1.9 at. % to about 5.8 at. %, or the dopant material is cobalt, with the atomic percentage of the cobalt in the binary alloy being in the range of from about 1.9 at. % to 5.7 at. %.

Further, it is proposed that the thickness of the coating is 100 nm or less, preferably the thickness of the coating being in the range of from 40 nm to 80 nm, more preferably the thickness of the coating being in the range of from 50 nm to 70 nm, most preferably the thickness of the coating being about 60 nm.

The human machine interface of the present disclosure can be part of a door handle, a rearview device, a dashboard and/or an interior space of a motor vehicle.

The present disclosure also refers to a rearview device, in particular an interior rearview device, of a motor vehicle with the human machine interface according to the present disclosure, characterized in that the operating panel is provided by a frame or bezel for rearview means, and the display unit is part of the rearview means.

In another aspect, a motor vehicle includes at least one human machine interface. The motor vehicle is characterized in that the function includes a first function controlling at least one motor vehicle component, in particular in form of a door, a rearview device and/or a lighting device, and/or the function includes a second function of an infotainment system of the motor vehicle, and/or the function and/or the displayed information on the function can be selected and/or changed and/or the point of the time and/or the duration of the displaying of the information on the display unit can be selected and/or changed.

It is proposed that the control means of the human machine interface is part of the vehicle control unit.

With the human machine interface of the present disclosure an operating device is created that allows for contacts to be activated by light sensing, in particular through a chrome-line, reducing fingerprints and contamination while preserving the chrome appearance.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the present disclosure is not limited to the precise arrangements and instrumentalities shown. The accompanying drawings, which are incorporated in and constitute a part of this specification, illustrate an implementation of devices consistent with the present disclosure in a schematic manner and, together with the description, serve to explain advantages and principles consistent with the present disclosure.

DETAILED DESCRIPTION

Figure 1:
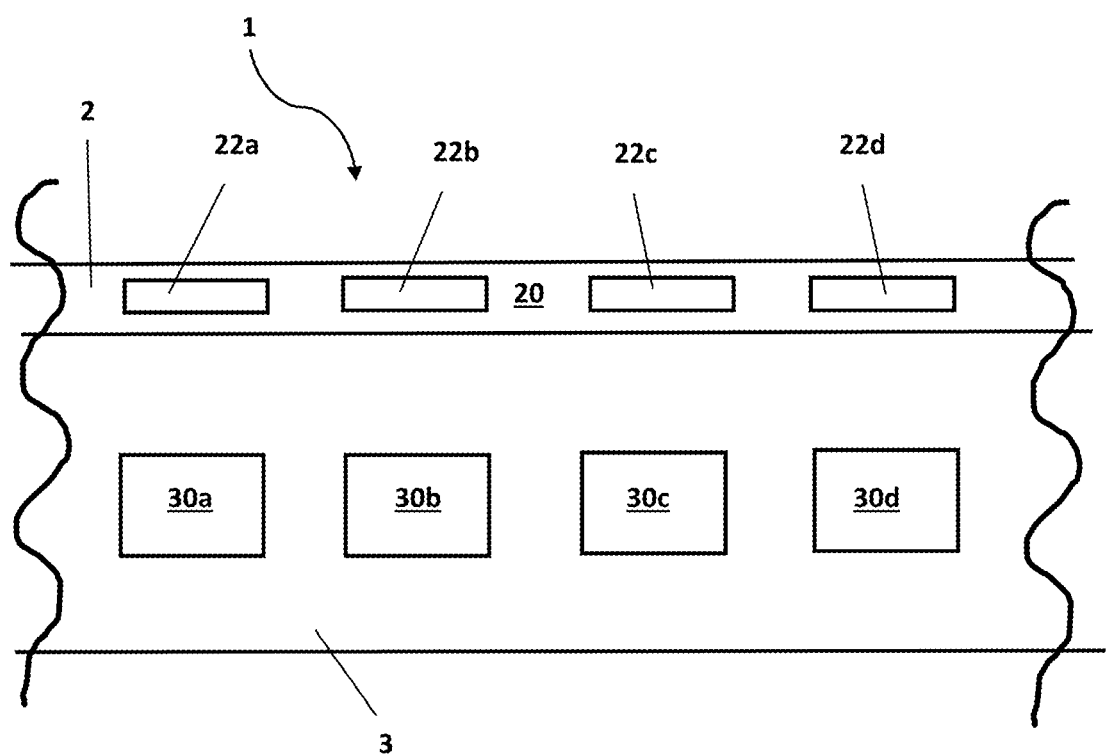
FIG. 1 is a front view of a human machine interface according to the present disclosure.

Before explaining examples of the present disclosure in detail, it is to be understood that the present disclosure is not limited in its application to the details of construction and to the arrangements of the components set forth in the following description or illustrated in the drawings. The figures and written description are provided to teach any person skilled in the art to make and use the present disclosure for which patent protection is sought. The present disclosure is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present present disclosures will require numerous implementation-specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "corner," are used in the description for clarity in specific reference to the figures and are not intended to limit the scope of the present disclosure or the appended claims. Further, it should be understood that any one of the features of the present disclosure may be used separately or in combination with other features. Other systems, methods, features, and advantages of the present disclosure will be or become apparent to one with skill in the art upon examination of the figures and the detailed description. It is intended that all such additional systems, methods, features, and advantages be included within this description, be within the scope of the present present disclosure, and be protected by the accompanying claims.

A human machine interface 1 of the present disclosure includes an operating panel 2 separate from a display unit 3, as shown in FIG. 1. The operating panel 2 includes a transparent or translucent substrate (not shown), preferably in form of a polymeric substrate. The substrate is provided with a chromium-based reflective coating 20 as described in particular in EP 2807 284 B1, with the coating 20 being provided with a number of cut-outs 22a-22d for example obtained by laser cutting out in order to provide key areas acting as touch buttons. The display unit 3 is not provided with any buttons and does not act as touch screen, but is provided with information sections 30a-30d. Each information section 30a-30d is associated with and aligned to one cut-out 22a-22d in order to provide information on a function which can be activated by touching the associated cut-out 22a-22d.

At least one not shown illumination source is provided underneath the substrate with its chromium-based reflective coating 20 for emitting light there through. The light coming through the cut-outs 22a-22d is less intense than the original light emitted by the illumination source.

Each information section 30a-30d provides at least at selected times and/or during selected time intervals information on a function to be controlled by the human machine interface 1. The functions are displayed on the display unit 3 as on demand functions.

The light emitted though the cut-outs 22a-22d is monitored and in case the light beam through one of the cut-outs 22a-22d is interrupted for a certain amount of time, it is determined that a user has touched the button provided by said one cut-out 22a-22d to active the function defined by the information on the information section 30a-30d associated with the said one cut-out 22a-22d. In response thereto said function is activated.

Figure 2A:
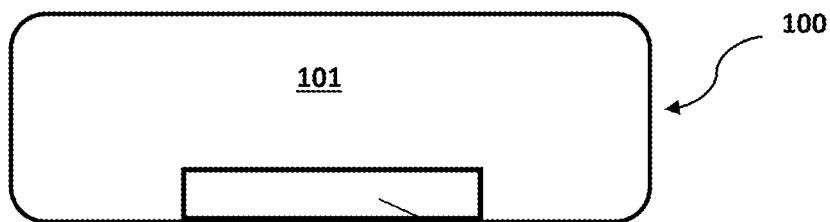
FIGS. 2a, 2b, 2c, and 2d are front views of a rearview device, a door handle, a dashboard and a door each provided with a human machine interface in line with FIG. 1.
Figure 2B:
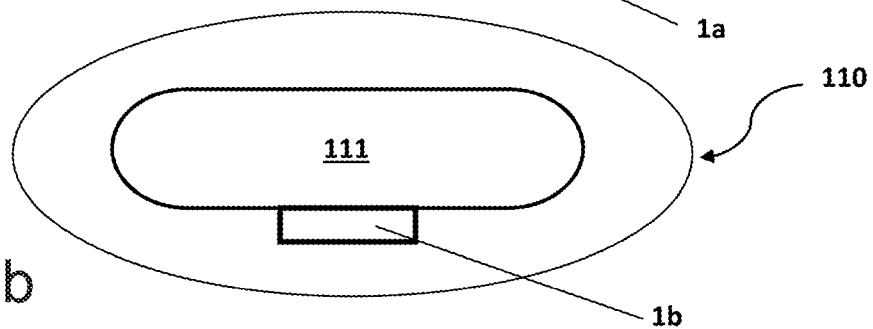
Figure 2C:
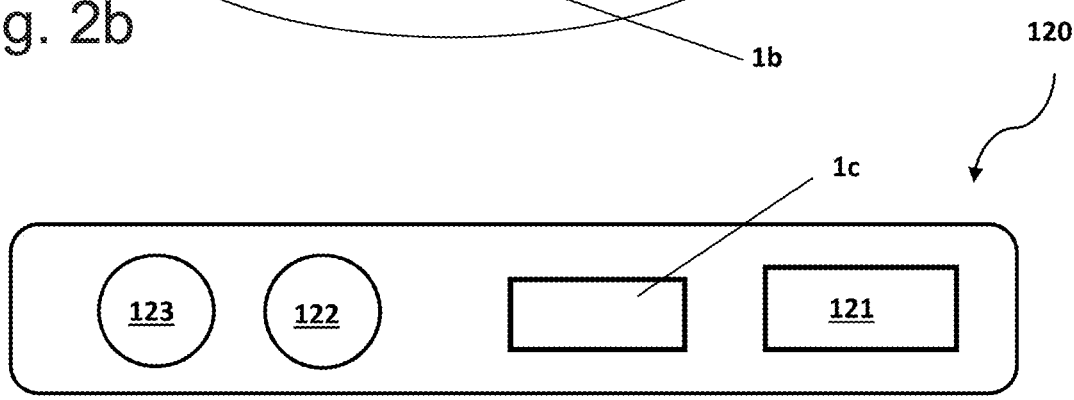
Figure 2D:
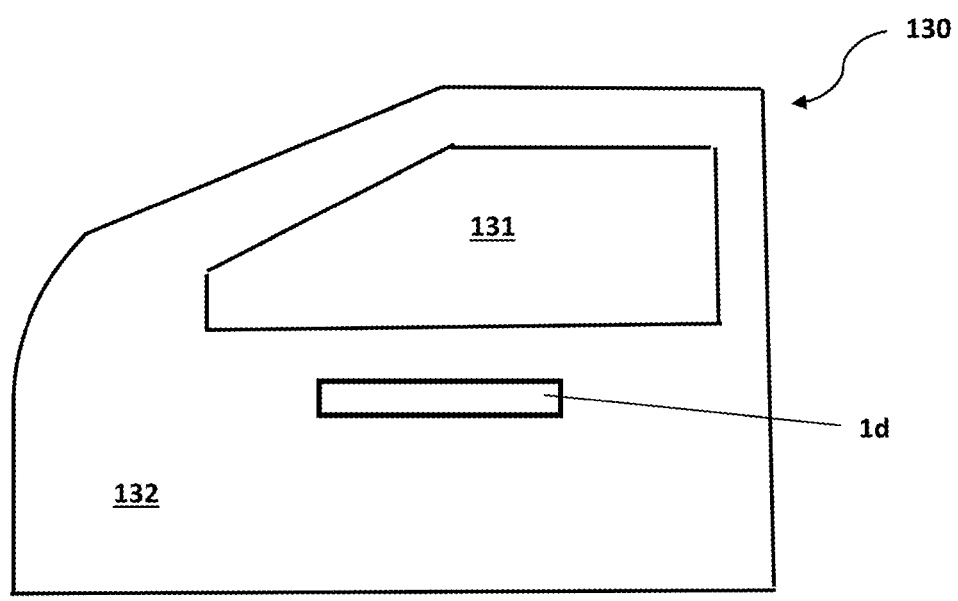

The human machine interface 1 of the present disclosure can be part of many devices, and is particularly suited for automotive components as shown in FIGS. 2a to 2a. The respective human machine interfaces 1a, 1b, 1c, 1d can be part of:
  an interior rearview device 100, e.g. in the lower region of the interior rearview element, which can be provided by a mirror and/or display element 101;
  a door handle 110, e.g. below the grip opening 111;
  a dashboard 120, e.g. between other displays 123, 124 and a touchscreen 121; and/or
  a door 130, e.g. below a window 131 in the interior panelling 132.

The operating panel 2 can be in form of a line or frame arranged next to the display unit 3. In case the human machine interface 1a is part of the interior rearview device 100, the operating panel 2 can belong to a frame (not shown) and the display unit 3 can belong to the mirror and/or display element 101. The functions to be active by touching the operating panel 2 in the region of the buttons provided by the cut-outs 22a-22d can be for example "unlocking a door", "adjusting an external rearview mirror", "illuminating the driver cabin" and "switching to autonomous driving", but any other function which can be activated by a user of a motor vehicle can also be implemented.

Thus, an activation and, subsequent, control achieved via the human machine interface 1 of the present disclosure by touching the operating panel 2 with a finger in the region of one of the cut-outs 22a-22d will leave no fingerprints on the display unit 3, in contrast to the usage of a conventional touch screen.

The cut-outs can be provided in any desired geometry and/or relative arrangement.

Figure 3:
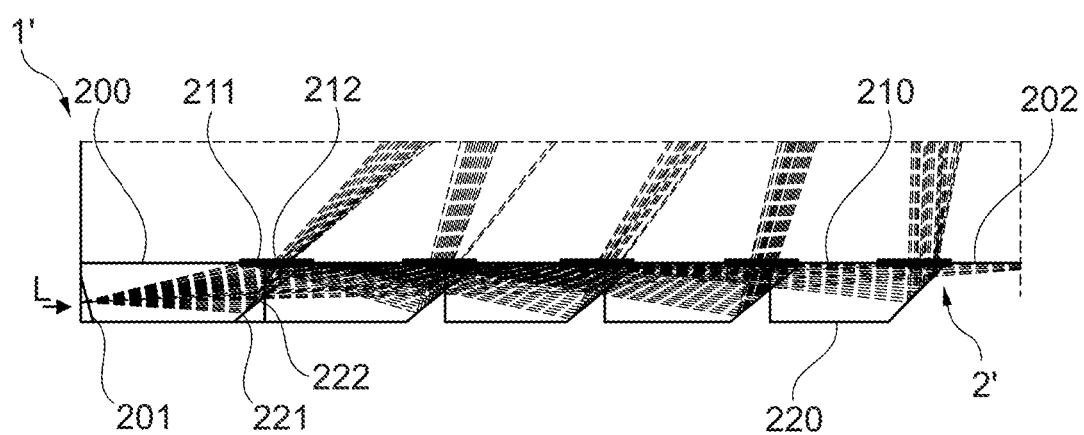
FIG. 3 is a cross-section of an operating panel of an alternative human machine interface according to the present disclosure.

An alternative human machine interface of the present disclosure includes an alternative operating panel 2', as shown in FIG. 3. This alternative operating panel 2' is provided separate from a not shown display unit, which corresponds to the display unit 3 of FIG. 1.

In detail, an optical waveguide 200 of the operating panel 2' is provided on its left, first end with a light coupling surface 201, which runs with an inclination angle of approx. 105° to a light deflection surface 220 arranged parallel to an operating surface 210. On the right end of the optical waveguide 200 there is an optical waveguide end surface or light exit surface 202 which has an angle approx. 90° relative to the operating surface 210. In the light deflection surface 220, five light extraction elements are arranged equidistant from each other in the form of recesses 221, with the same length respectively along the light deflection surface 220, but with different depths. The recesses 221 are saw-tooth like with a sloping edge, in the area of which light deflection points 222 are provided, and a further edge running essentially vertically to the light deflection surface 220, aside from the furthest right-hand recess 221. The inclination of the slope including the light deflection points 222 is respectively given by an angle of approx. 45° to the light deflection surface 220, which is the same for all recesses 221. Essential for the slope and thus for the angle of approx. 45° is the guarantee of total reflection of transmission signals.

The optical waveguide 200 can be provided in the form of an acrylic glass which only allows light to exit in the area of the light exit surface 202. In order to enable deflected rays to exit from exit points 212, the acrylic glass can be polished in precisely these areas, which represent five key areas 211. The five recesses 221 in the light deflection surface 220 correspond to the five key areas 211 on the operating surface 210. It is preferred that the light intensity is equal in value at the light exit points 212 of each key area 211.

Light rays L of for example a transmitter of a not shown ToF sensor can enter the optical waveguide 200 via the light coupling surface 201 and are reflected within the optical waveguide 200, on at least one of the five recesses 221, namely on a light deflection point 222 respectively, so that light rays of the same intensity exit from the optical waveguide 200 in the five key areas 211, namely on a light exit point 212 respectively, insofar as no object, in particular a finger, touches at least one of the key areas.

If a touch, not shown, occurs on one of the key areas 211, this leads to at least one further reflection, namely on the touch point, which directs light back to the light coupling surface 201. Through this further reflection, reception signals can thus reach a receiver of the ToF sensor and be evaluated there. The ToF sensor enables the determination of the key area which has been touched within the scope of its evaluation, namely due to its ability to calculate distances.

The optical waveguide 200 can be equipped with a reflection layer on the operating surface, namely beyond the key areas 211, and/or on the light deflection surface 220, in order to prevent light rays from exiting the optical waveguide 200 in an uncontrolled manner, i.e. beyond the key areas and the light exit surface.

With reference to FIGS. 1 and 3, key areas or buttons, which are arranged one behind the other, i.e. sequentially, and have a square form, are shown. Alternative arrangements and/or geometries, even on more than one substrate, are possible and depend on the cooperating display unit as well as the device to be equipped with the human machine interface of the present disclosure. The separation of the operating panel from the display unit allows for a multitude of design variants.

The information sections of the display device do not have to display their respective information at all times. Rather it is advantageous that the respective information displaying can be actuated by a user, preferably when approaching the human machine interface, in particular with a finger to touch one of the key areas.

Further, the touch determination provided by the human machine interface of the present disclosure without using the ToF sensing method is cheaper than the human machine interface of the present disclosure with using the ToF sensing method. But the one with using the ToF sensing method provides more functions, like activating the displaying of information within the information sections of the display unit when a finger of a user is approaching the human machine interface.

The features disclosed in the above description, the claims and the drawing can be essential both individually and in any combination for the realization of the present disclosure in its different embodiments.

LIST OF REFERENCE NUMERALS 1, 1a-d, 1' human machine interface
2 operating panel
20 coating
22a-22d cut-out
3 display unit
30a-30d information section
100 interior rearview device
101 mirror and/or display element
110 door handle
111 grip opening
120 dashboard
121 touch screen
122, 123 display
130 door
131 window
132 interior panelling
200 optical waveguide
201 light coupling surface
202 light exit surface
210 operating surface
211 key area
212 light exit point
220 light deflection surface
221 recess
221 light extraction element
222 light deflection points
L light rays

What is claimed is:
1. A human machine interface with light sensing contact activation, comprising:
  an operating panel; and
  a display unit,
  wherein the operating panel comprises at least one or more of a transparent or a translucent substrate provided with at least one key area and at least one illumination source which can emit light into the substrate,
  the display unit provides at least one information section at least temporarily displaying information on at least one function which can be contact activated via the at least one key area of the operating panel,
  a plurality of information sections and a plurality of key areas are provided, with each key area being associated with one information section, and
  each one of the key areas is aligned with and arranged next to one information section associated therewith, and wherein the operating panel includes a line arranged along an edge of the display unit, wherein the at least one transparent or translucent substrate is provided with a reflective coating with at least one opening or region of reduced thickness defining the at least one key area, with light emitted by the at least one illumination source can pass through the substrate and the opening or region of reduced thickness of the reflective coating.

2. The human machine interface according to claim 1, wherein at least one of the function or the information on the function displayed in the information section can be changed by one or more of a user or depending on at least one parameter.

3. The human machine interface according to claim 1, further comprising:
at least one ToF (Time-of-Flight) sensor configured to monitor the at least one illumination source, and
a controller configured to control the function defined by the information section depending on the light sensed by the at least one ToF sensor,
wherein in response to at least one of light is sensed, it is monitored that sensed light is interrupted for a certain amount of time, or sensed light level is reduced or enhanced in a certain amount, the controller activates the function.

4. The human machine interface according to claim 1, wherein the reflective coating is a chromium-based reflective coating.

5. The human machine interface according to claim 4, wherein the coating has a thickness of 200 nm or less and is an alloy of chromium and a dopant material, the dopant material being selected from the hexagonally close-packed transition metals, and the alloy having a crystal structure of a primary body-centered cubic phase in coexistence with a secondary omega hexagonally close-packed phase,
the alloy is a binary alloy of chromium and the dopant material, and
the atomic percentage of the dopant material in the binary alloy is in the range of from about 1.9 at. % to about 5.8 at. %.

6. The human machine interface according to claim 5, wherein at least one of:
the dopant material is selected from the hexagonally close-packed transition metals zirconium, titanium, cobalt, hafnium, ruthenium, yttrium and osmium, or the dopant material is selected from the hexagonally close-packed transition metals zirconium, titanium and cobalt, or
the dopant material is zirconium, with the atomic percentage of the zirconium in the binary alloy being in the range of from about 4.5 at. % to about 5.8 at. %, or the dopant material is titanium, with the atomic percentage of the titanium in the binary alloy being in the range of from about 1.9 at. % to about 5.8 at. %, or the dopant material is cobalt, with the atomic percentage of the cobalt in the binary alloy being in the range of from about 1.9 at. % to 5.7 at. %.

7. The human machine interface according to claim 5, wherein the thickness of the coating is 100 nm or less, the thickness of the coating being in the range of from 40 nm to 80 nm, the thickness of the coating being in the range of from 50 nm to 70 nm, or the thickness of the coating being about 60 nm.

8. The human machine interface according to claim 1, wherein at least one of:
the opening or region of reduced thickness of the coating comprise a cut-out, or
the coating is provided with at least one selective laser cut-out in a depth of the coating, each cut-out providing one opening.

9. The human machine interface according to claim 1, wherein the at least one or more of the transparent or the translucent substrate provides at least one optical waveguide for guiding the light emitted by the at least one illumination source to at least one deflection point, and for guiding deflection signals deflected at the deflection point to at least one assigned exit point in the at least one key area on a first surface of the optical waveguide, the first surface acting as an operating surface, and, in response to an object, in the form of a finger of a user, approaching the exit point or touching the same, for guiding reception signals deflected at the object; and
the control means triggers the function assigned to the key area in receipt of information signals outputted by the ToF sensor dependent on the reception signals.

10. The human machine interface according to claim 9, wherein the deflection point is provided on a second surface which is opposite to the first surface of the optical waveguide and constitutes a deflection surface of the optical waveguide via an extraction element, and
the extraction element is provided by a recess, in the form of a milled point, in the material of the optical waveguide or via one or more of a material inclusion or a coating.

11. The human machine interface according to claim 1, further comprising at least one mark in the key area, in the form of a coating, surface processing such as polishing or illumination of the optical waveguide, with visible light transmitted when an object approaches, such as in the form of a finger of a user, or with greater intensity when registering a touch of the key area by the object.

12. The human machine interface according to claim 1, wherein the substrate is a polymeric substrate, the polymeric substrate includes a pre-coated film in the form of either a hardcoat, an inorganic oxide, or a thin metal film, or a combination of such pre-coated films.

13. The human machine interface according to claim 1, wherein the human machine interface part of at least one a door handle, a rearview device, a dashboard, or an interior space of a motor vehicle.

14. A rearview device of a motor vehicle, comprising:
a human machine interface with light sensing contact activation, comprising:
an operating panel; and
a display unit,
wherein the operating panel comprises at least one or more of a transparent or a translucent substrate provided with at least one key area and at least one illumination source which can emit light into the substrate,
the display unit provides at least one information section at least temporarily displaying information on at least one function which can be contact activated via the at least one key area of the operating panel,
a plurality of information sections and a plurality of key areas are provided, with each key area being associated with one information section,
each one of the key areas is aligned with and arranged next to one information section associated therewith, and wherein the operating panel includes a line arranged along an edge of the display unit,
the operating panel is provided by a frame or bezel for an interior rearview device, and
the display unit is part of the interior rearview device, wherein the at least one or more transparent or translucent substrate is provided with a reflective coating with at least one opening or region of reduced thickness defining the at least one key area, with light emitted by the at least one illumination source can pass through the substrate and the opening or region of reduced thickness of the reflective coating.

15. The rearview device of claim 14, wherein the reflective coating is a chromium-based reflective coating.

16. A motor vehicle, comprising
a human machine interface with light sensing contact activation, comprising:
an operating panel; and
a display unit,
wherein the operating panel comprises at least one or more of a transparent or a translucent substrate provided with at least one key area and at least one illumination source which can emit light into the substrate,
the display unit provides at least one information section at least temporarily displaying information on at least one function which can be contact activated via the at least one key area of the operating panel,
a plurality of information sections and a plurality of key areas are provided, with each key area being associated with one information section,
each one of the key areas is aligned with and arranged next to one information section associated therewith, and wherein the operating panel includes a line arranged along an edge of the display unit, and
at least one of:
the function comprises a first function controlling at least one motor vehicle component including at least one of a door, a rearview device, or a lighting device,
the function comprises a second function of an infotainment system of the motor vehicle,
the function or the displayed information on the function can be selected or changed, or
the point of the time or the duration of the displaying of the information on the display unit can be selected or changed,
wherein the at least one transparent or translucent substrate is provided with a reflective coating with at least one opening or region of reduced thickness defining the at least one key area, with light emitted by the at least one illumination source can pass through the substrate and the opening or region of reduced thickness of the reflective coating.

17. The motor vehicle of claim 16, wherein the reflective coating is a chromium-based reflective coating.

* * * * *